United States Patent
Reid et al.

(10) Patent No.: US 8,880,829 B2
(45) Date of Patent: Nov. 4, 2014

(54) METHOD AND APPARATUS FOR EFFICIENT, LOW-LATENCY, STREAMING MEMORY COPIES

(71) Applicant: Qualcomm Innovation Center, Inc., San Diego, CA (US)

(72) Inventors: Gregory A. Reid, Durham, NC (US); Terence J. Lohman, Raleigh, NC (US); Brent L. Degraaf, Raleigh, NC (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 173 days.

(21) Appl. No.: 13/681,036

(22) Filed: Nov. 19, 2012

(65) Prior Publication Data

US 2014/0143513 A1    May 22, 2014

(51) Int. Cl.
  *G06F 13/14* (2006.01)
  *G06F 12/16* (2006.01)
(52) U.S. Cl.
  CPC .................................... *G06F 12/16* (2013.01)
  USPC ........................... 711/165; 711/202; 711/221
(58) Field of Classification Search
  CPC .... G06F 3/0646; G06F 3/0613; G06F 3/0611
  USPC ......................................... 711/165, 202, 221
  See application file for complete search history.

(56) References Cited

U.S. PATENT DOCUMENTS

| | | | |
|---|---|---|---|
| 5,704,053 A | 12/1997 | Santhanam | |
| 5,854,934 A | 12/1998 | Hsu et al. | |
| 5,964,867 A | 10/1999 | Anderson et al. | |
| 7,669,194 B2 | 2/2010 | Archambault et al. | |
| 7,702,856 B2 | 4/2010 | Krishnaiyer et al. | |
| 2004/0117557 A1 | 6/2004 | Paulraj et al. | |
| 2007/0055961 A1 | 3/2007 | Callister et al. | |
| 2008/0189512 A1* | 8/2008 | Hansen et al. | 712/1 |
| 2009/0100227 A1* | 4/2009 | Hansen et al. | 711/119 |
| 2011/0213926 A1 | 9/2011 | Ledford | |
| 2013/0212334 A1 | 8/2013 | Michalak et al. | |
| 2013/0298127 A1* | 11/2013 | Meier et al. | 718/100 |

FOREIGN PATENT DOCUMENTS

EP    1039382 A1    9/2000

OTHER PUBLICATIONS

Co-pending U.S. Appl. No. 13/369,548, filed Feb. 9, 2012.
Co-pending U.S. Appl. No. 13/784,088, filed Mar. 3, 2013.

* cited by examiner

*Primary Examiner* — Than Nguyen
(74) *Attorney, Agent, or Firm* — Neugeboren O'Dowd PC

(57) ABSTRACT

Systems, methods, and apparatus with improved techniques for copying data from a source memory location to a destination memory location are disclosed. An exemplary method includes receiving a source address that indicates the source memory location, a destination address that indicates the destination memory location, and receiving a size indicator that indicates the size of the data. When the size is less than a threshold size, a particular pointer in a jump table is accessed, based upon the size that points to particular load and store instructions. The jump table includes a plurality of pointers that point to a corresponding one of a plurality of load and store instructions. The particular load-store instructions are then executed with a processor of the computing device to copy the data from the source memory location to the destination memory location. Several other efficiency-improvement aspects are also disclosed that may be used in connection with these steps to further improve copy efficiencies.

33 Claims, 7 Drawing Sheets

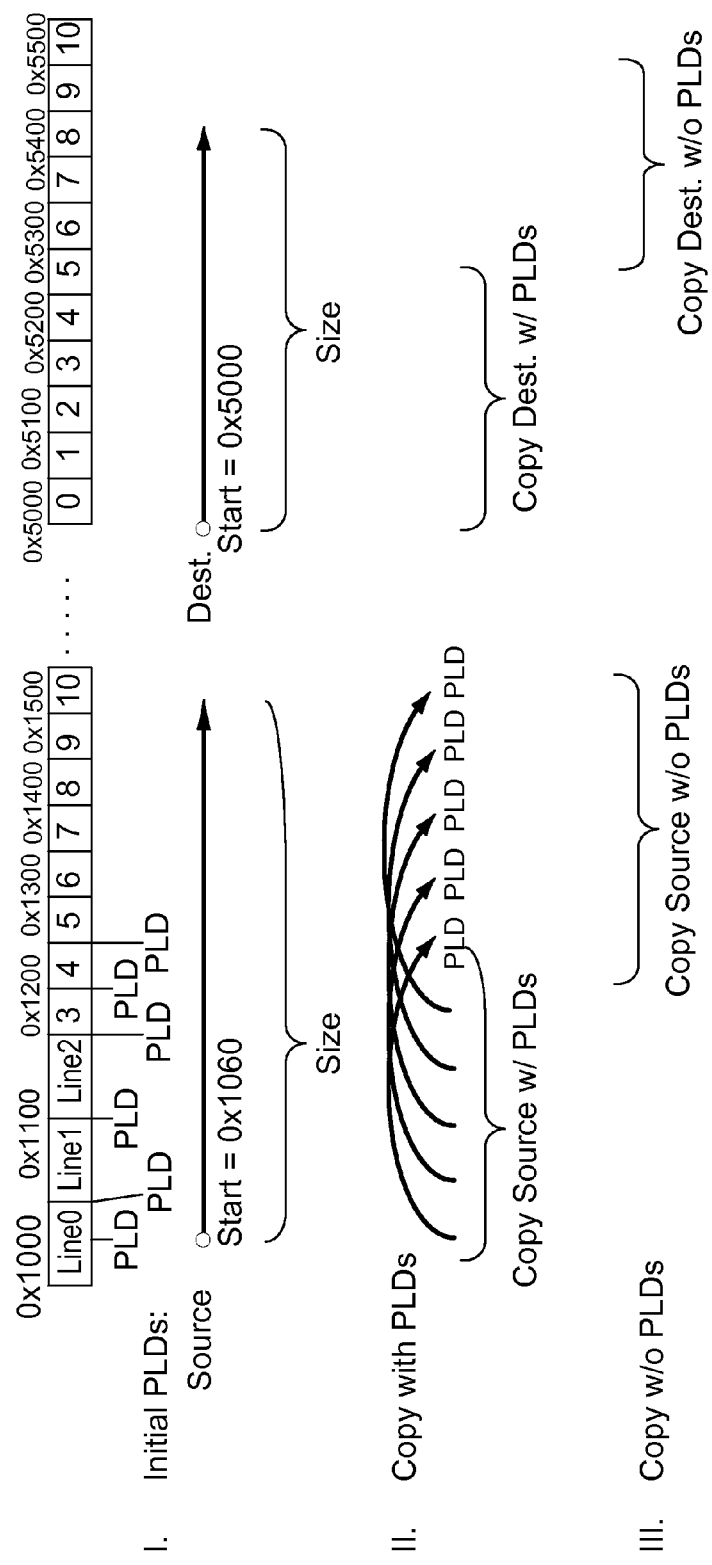

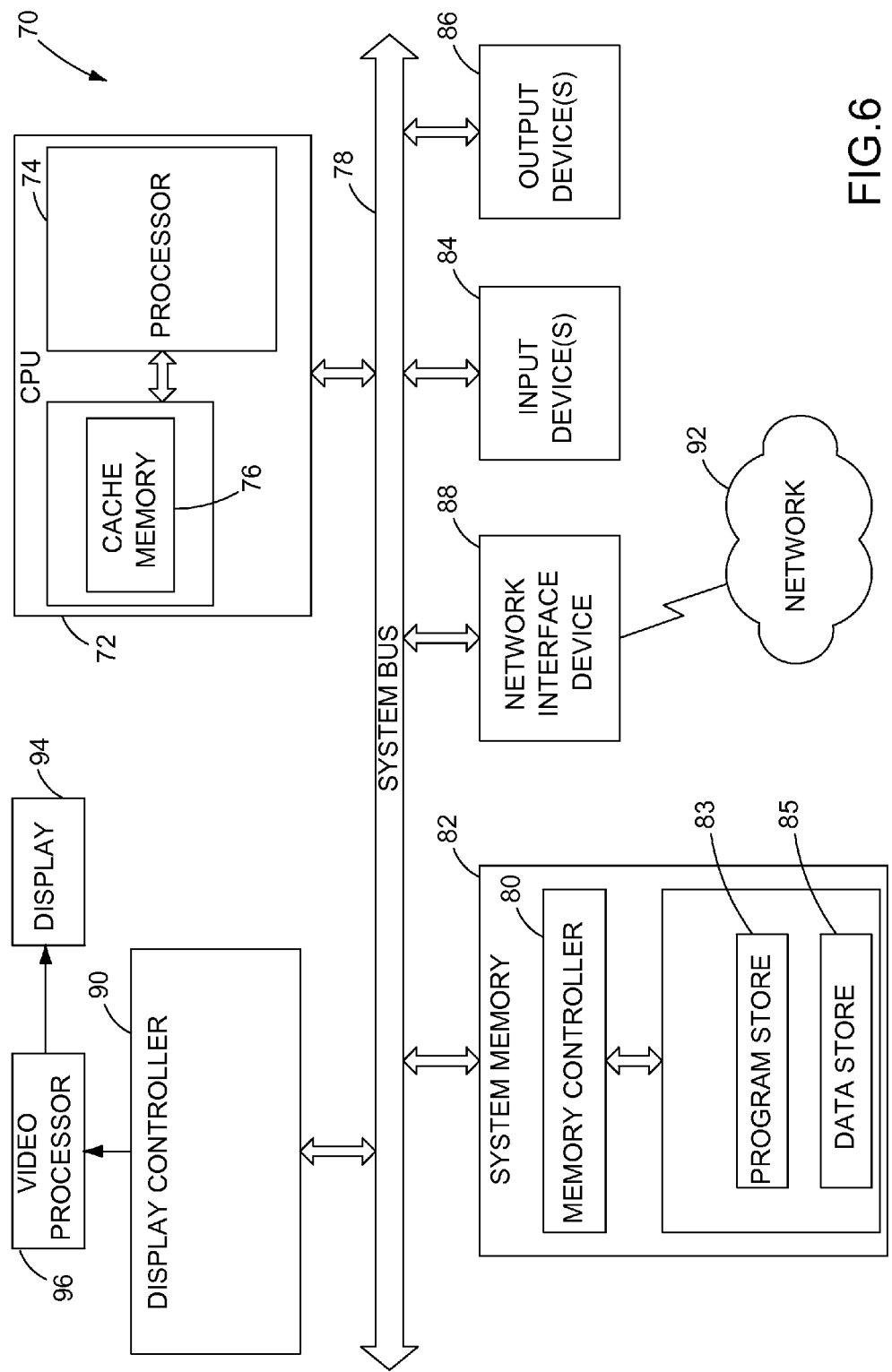

| Number of Bytes Transferred Per Instruction | ARM Single GPR | ARM Double GPR (DW-aligned) | ARM Multiple GPR (DW-aligned) | Neon "Single-Lane" | Neon "All Lanes" |
|---|---|---|---|---|---|
| 1 | ldrb rx<br>strb rx | | | vld1.8 {dx[0]}<br>vst1.8 {dx[0]} | |
| 2 | ldrh rx<br>strh rx | | | vld1.16 {dx[0]}<br>vst1.16 {dx[0]} | |
| 4 | ldr rx<br>str rx | | ldrm rx<br>strm rx | vld1.32 {dx[0]}<br>vst1.32 {dx[0]} | vld1 {sx}<br>vst1 {sx} |
| 8 | | ldrd rx<br>strd rx | ldrm rx<br>strm rx | vld1.64 {dx[0]}<br>vst1.64 {dx[0]} | vld1 {dx}<br>vst1 {dx} |
| 16 | | | ldrm rx<br>strm rx | | vld1 {qx}<br>vst1 {qx} |
| 32 | | | ldrm rx<br>strm rx | | vld1 {qx, qy}<br>vst1 {qx, qy} |

FIG. 7

METHOD AND APPARATUS FOR EFFICIENT, LOW-LATENCY, STREAMING MEMORY COPIES

BACKGROUND

1. Field

The present invention relates generally to memory data transfers, and more specifically, to memory copies in processor-based systems.

2. Background

Microprocessors perform computational tasks in a wide variety of applications. A typical microprocessor application includes one or more central processing units (CPUs) that execute software instructions. The software instructions instruct a CPU to fetch data from a location in memory, perform one or more CPU operations using the fetched data, and store or accumulate the result. The memory from which the data is fetched can be local to the CPU, within a memory "fabric," and/or within a distributed resource to which the CPU is coupled. CPU performance is often measured in terms of a processing rate, which may be measured as the number of operations that can be performed per second. The speed of the CPU can be increased by increasing the CPU clock rate, but because many CPU applications require fetching data from the memory fabric, increases in CPU clock speed without similar decreases in memory fabric fetch times (latency) will only increase the amount of wait time in the CPU for the arrival of fetched data.

For small copies, most memory copy algorithms utilize more CPU time in function call, size comparison, and looping overhead than in instructions that actually load and store data to and from memory. There is therefore a need in the art for more efficient copying of data from one location in memory to another location in memory.

SUMMARY

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Aspects of the invention may be characterized as a method for copying data from a source memory location to a destination memory location on a computing device. The method may include receiving a source address indicating the source memory location; receiving a destination address indicating the destination memory location; and receiving a size indicator indicating a size of the data. When the size is less than a threshold size, a particular pointer in a jump table is accessed that points to particular load and store instructions based upon the size of the data, and the particular load-store instruction is then executed on the computing device to copy the data from the source memory location to the destination memory location.

Aspects of the invention may also be characterized as a computing device that includes at least one processor, memory to store data that is processed by the processor, and a plurality of load/store instruction sets that each, when executed, transfers a particular number of bytes in the memory. The computing device also includes a jump table that includes pointers to each of the plurality of load/store instruction sets. A memory copy component in the computing device receives a source address, a destination address, and an indicator of a size of data to be copied and utilizes the jump table to initiate execution of a particular load/store instruction set based upon the size of the data to be copied in order to copy the data from the source address in the memory to the destination address in the memory.

BRIEF DESCRIPTION OF THE DRAWINGS

FIG. 5 is a graphical representation of another exemplary memory copy process;

FIG. 6 is a block diagram depicting exemplary components that may be utilized to implement the computing device depicting in FIG. 1;

FIG. 7 is a table depicting exemplary load and store instructions associated with selected hardware architectures.

DETAILED DESCRIPTION

Figure 1:
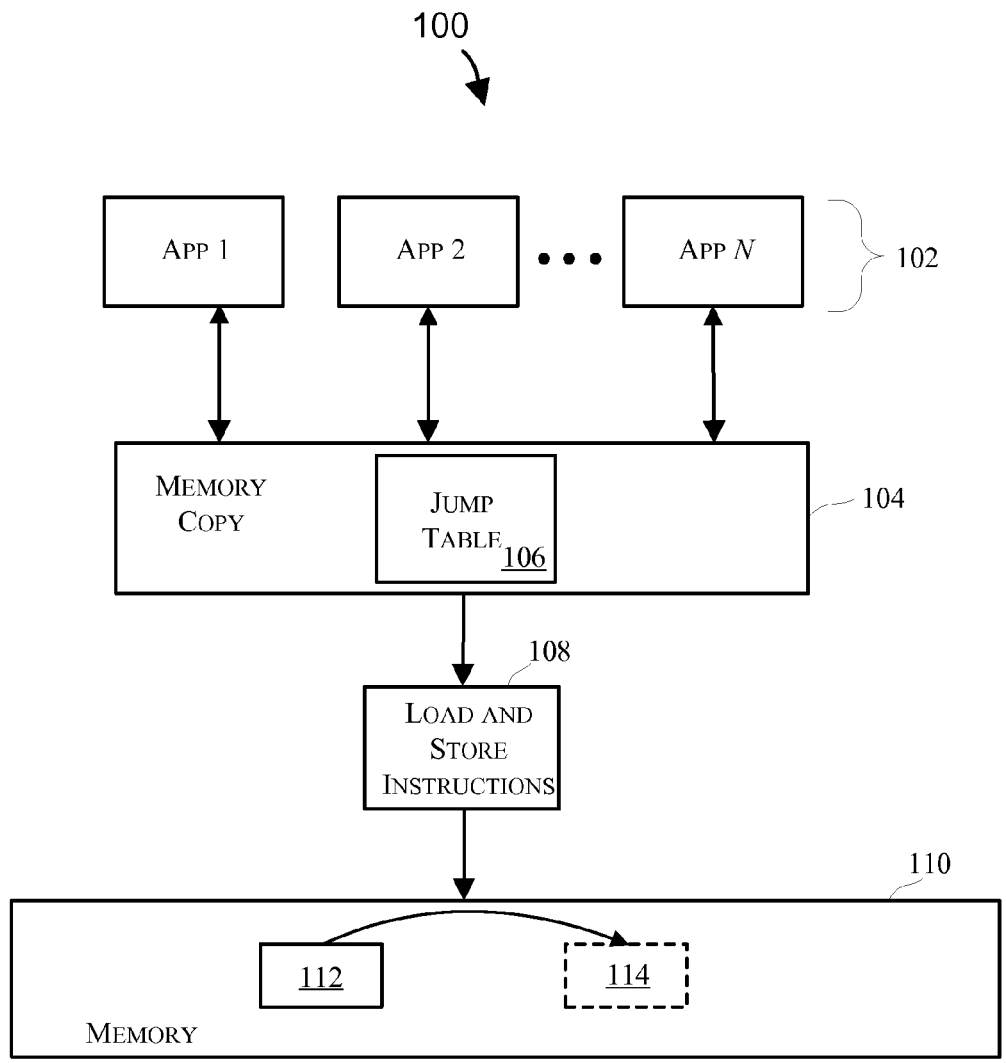
FIG. 1 is a block diagram depicting an exemplary computing device.

The word "exemplary" is used herein to mean "serving as an example, instance, or illustration." Any embodiment described herein as "exemplary" is not necessarily to be construed as preferred or advantageous over other embodiments.

Among several other benefits of embodiments disclosed herein are improvements to the performance of relatively small-size copies of data without adversely affecting the performance of relatively large-size copies of data.

The relative benefits of these embodiments will be better appreciated in view of three potential alternative approaches, which are representative of techniques that have been utilize in connection with implementing prior versions of the memcopy function. The first and simplest prior approach copies one byte at a time from the address source pointer to the destination pointer and then increments the pointers until all the bytes have been copied. Here is an example of how such an algorithm could be implemented:

1. First memcpy is called with destination pointer, source pointer, and copy size in three general-purpose registers ("GPRs"). Two additional unreserved registers, GPR-U1 and GPR-U2 are free.
2. The destination pointer register is pushed onto the stack (the POSIX standard requires this to be returned unchanged).
3. The register GPR-U1 is assigned with the sum of source+size—this register is referred to as "source-end."
4. The register GPR-U2 is used to hold the temporary byte to copy from the source to the destination—this register is referred to as "copy-byte."
5. The byte referenced by the source pointer is loaded to copy-byte and the source pointer is incremented by 1 byte.
6. The copy-byte register is stored to the register pointed to by the destination pointer and the destination pointer is incremented by 1 byte.
7. At this point, if source-pointer is less than source-end, then the process goes back to step 5.

8. The destination pointer register is then popped from the stack (POSIX standard requires this to be returned unchanged), and the function is then exited.

This implementation is the easiest to understand, but it is slow since it requires at least three steps (which requires four ARM instructions) to copy each byte in size.

A more efficient algorithm reduces the number of steps required for copying data by copying four-byte words instead of single bytes as much as possible. Because each GPR on a CPU typically holds 4 bytes (for a 32-bit CPU) or 8 bytes (for a 64-bit CPU), 4 or 8 bytes may be loaded and stored in the same amount of time as it takes to load and store a byte.

This second approach utilizes a four-byte memcpy algorithm, which may be implemented as follows:

1. First, memcpy is called with a destination pointer, source pointer, and a copy size in three GPR registers. Two additional unreserved registers, GPR-U1 and GPR-U2, are free.
2. The destination pointer register is pushed onto the stack (POSIX standard requires this to be returned unchanged).
3. The register GPR-U1 is assigned with the sum of source+size—this register is referred to as "source-end."
4. The register GPR-U2 is used to hold the temporary word to copy from source to destination—this register is referred to as "copy-word."
5. The 4-byte-word referenced by the source pointer is loaded to copy-word and the source pointer is incremented by 4 bytes.
6. Copy-word is then stored to the register pointed to by the destination pointer and the destination pointer is incremented by 4 bytes.
7. If the source-pointer plus 3 is less than source-end, then the process goes back to step 5.
8. The byte referenced by the source pointer is loaded to copy-word and the source pointer is incremented by 1 byte.
9. The copy-word register is stored to the register pointed to by the destination pointer and increment the destination pointer by 1 byte.
10. At this point, if the source-pointer is less than source-end, the process returns to step 8.
11. The destination pointer register is then popped from the stack (the POSIX standard requires this to be returned unchanged), and the function is exited.

This second algorithm is equivalent to the first algorithm, except for the addition of steps 5-7. In addition, it requires approximately a quarter of the dynamic number of instructions of the first algorithm and is likely to be considerably faster.

The third approach, which is even faster using SIMD registers, instead of GPRs, for copying 16 bytes at a time may be implemented as follows:

1. First, memcpy is called with a destination pointer, source pointer and a copy size in three GPR registers. Two additional unreserved registers, GPR-U1 and GPR-U2 are free.
2. The destination pointer register is pushed onto the stack (the POSIX standard requires this to be returned unchanged).
3. GPR-U1 is assigned with the sum of source+size—this register is referred to as "source-end."
4. Then GPR-U2 is used to hold the temporary word to copy from source to destination—this register is referred to as 'copy-word."
5. SIMR-Q1 (an unreserved SIMD register) is the used to hold the temporary 16-byte-word to copy from the source to the destination—this register is referred to as "copy-word16."
6. The 16-byte-word referenced by the source pointer is loaded to copy-word16 and then the source pointer is incremented by 16 bytes.
7. The copy-word16 register is then copied to the register pointed to by the destination pointer and the destination pointer is incremented by 16 bytes.
8. If source-pointer plus 15 is less than source-end, then the process go back to step 6.
9. The 4-byte-word referenced by the source pointer is then loaded to copy-word and the source pointer is incremented by 4 bytes.
10. The copy-word register is then copied to the register pointed to by the destination pointer and the destination pointer is incremented by 4 bytes.
11. If the source-pointer plus 3 is less than source-end, then the process returns back to step 7.
12. The byte referenced by the source pointer is then loaded to copy-word and the source pointer is incremented by 1 byte.
13. The copy-word is then stored to the register pointed to by the destination pointer and the destination pointer is incremented by 1 byte.
14. If the source-pointer is less than source-end, the process goes back to step 11.
15. The destination pointer register is then popped from the stack (the POSIX standard requires this to be returned unchanged), and then the function is exited.

This third algorithm is equivalent to the second algorithm, except for the addition of steps 5-8. It requires approximately a quarter of the dynamic number of instructions of the first algorithm and is likely to be considerably faster.

These three examples are not the only implementations possible, but are "typical" variations of implementations used in various POSIX-based libraries. It is contemplated that other enhancements may be added. In particular:

Further throughput improvements are possible by adding instructions for loading and storing multiple SIMD registers of 16 bytes each per loop iteration (typically, powers of two, e.g., like 32, 64 or 256 bytes worth of data) rather than just a single SIMD register per loop. This could be referred to as a fourth algorithm, and may be implemented by adding three additional steps between steps 4 and 5, just as were done when going from the first to second algorithm, and from the second to third algorithm.

Adding PLDs (software preload instructions) to pre-fetch data will also make performance higher on systems without automatic data prefetch hardware. This addition could be a fifth algorithm, and prefetch instructions would need to be added to the third or fourth algorithms between steps 5 and 6 using a suitable PLD distance.

Another optimization that is typically applied in the prior art for the third, fourth, or fifth algorithms, is to add comparisons before step 1 to proceed directly to the code at the end of the steps that handles the smallest sizes. In other words, the third algorithm might be modified to add a step 0 that checks if a copy size is less than 4, and if the copy size is less than 4, the code branches to step 11. This makes copies less than 4 bytes faster, but slows down larger copies. This sort of optimization may be repeated more than once for different ranges of sizes.

Although each of the additional set of steps (going from the first, to the second, to the third, fourth, and fifth algorithms, etc.) improve maximum throughput for large-sized copies, these additional steps actually increase (rather than decrease) the number of instructions executed for small-sized copies, which reduces performance for these smaller copies. For small copies, most of the early steps in the algorithms discussed above turn out to do nothing because the copy-size is less than the amount of data it is possible to handle.

Several of the embodiments disclosed herein improve small-size-copy performance without substantially compromising large-size-copy-performance. Referring to FIG. 1 for example, shown is a block diagram depicting functional components of an exemplary embodiment of a computing device 100. As shown, the computing device 100 includes N applications 102 that are in communication with a memory copy component 104, which includes a jump table 106. Also shown are load and store instructions 108 that are in communication with the memory copy component 104 and the memory 110. One of ordinary skill in the art will appreciate that the depiction of components in FIG. 1 is a logical diagram to facilitate a more clear discussion of embodiments discussed in more detail further herein—it is neither intended to be a hardware diagram nor is it intended to depict constructs that are well-known to those of ordinary skill in the art.

For example, the depicted memory component 110 may be realized by a variety of different distributed physical memory elements in connection with operating-system-level components that provide virtual memory abstraction from the physical memory elements. It should also be recognized that the depicted components may be realized in connection with a variety of known operating system types including, without limitation, Android, Windows Phone, iOS, MeeGo, and Symbian OS type operating systems.

The applications 102 may be any of a variety of applications that utilize the memory 110 in connection with performing their intended functions. For example, the applications 102 may include gaming applications, utility applications, educational applications, and any other types of applications that copy data from one location in memory to another location.

The memory 110 depicts memory on the computing device 100 that is available for storing data that is utilized by the applications 102 and other constructs on the computing device that utilize memory. The memory 110 may be realized by a collection of different memory types, such as RAM memory, and executable code that provides a virtual memory interface for the applications 102 and other constructs on the computing device 102.

The load and store instructions 108 are low level instructions that are utilized by one or more processors of the computing device 100 to copy memory from the source location 112 to the destination location 114. The load and store instructions 108 may include, for example, a plurality of load and store instructions pairs, and each load instruction and store instruction in a particular pair effectuate the loading and storing of a particular number of bytes. Referring to FIG. 6, for example, shown are exemplary load and store instruction pairs for various ARM and Neon architectures that correspond to the transfer of 1, 2, 4, 8, 16, and 32 bytes per instruction. It should be recognized that the load and store instructions depicted in FIG. 6 are merely examples of load and store instructions and that the load and store instructions may vary based upon the particular processor architecture that is implemented within the computing device 100. As discussed further herein, prior art approaches to utilizing load and store instructions are substantially less than optimal.

The memory copy component 104 in this embodiment generally operates to utilize the load and store instructions 108 to copy data from one location 112 to another location 114 in a more efficient manner than the typical, prior approaches. More specifically, the memory copy component 104 enables data copying to be effectuated with less looping overhead, fewer instructions, less register usage, and less reliance on the stack. Thus memory copies are carried out much more quickly than prior, typical approaches. Analysis of systems, generally represented by the computing device 100 in FIG. 1, have shown that 1% to 2% of CPU time is used in connection with processing memory copy (e.g., memcpy) calls. As a consequence, the more efficient approach to memory copy calls that is implemented by the memory copy component 104 translates to less CPU overhead, and hence, an overall improved user experience.

As shown, the memory copy component 104 in this embodiment utilizes a jump table 106 to more effectively utilize the load and store instructions 108. In general, the jump table 106 includes pointers that point to particular load and store instructions based upon the size of the data to be copied, and the memory copy component 104 utilizes the jump table 106 to select particular load and store instructions to more efficiently copy data from one memory location 112 to another memory location 114.

In many embodiments, the memory copy component 104 is implemented as a user-space library that utilizes the same POSIX standard function prototype as the memcpy C language function:

void*memcpy(void const*dst, void const*src, size_t size)

In other words, many implementations of the memory copy component 104 take three parameters as inputs and return a pointer:

Dst—destination pointer (pointer to a first byte of memory to copy data to)

Src—source pointer (pointer to first byte of memory to copy data from)

Size—size of source and destination data to copy (in bytes).

Returns the destination pointer (with no change)

As discussed further herein, in many implementations the memory copy component 104 utilizes the jump table 106 for copies up to a particular threshold in size. This threshold may vary depending upon one or more factors, such as the particular processor architecture that is implemented in the computing device 100, but typically the threshold will be an integral power of two. For example, the threshold may be 8, 16, 32, 64, 128, or 256 bytes in size, but merely for ease of description herein, the threshold is assumed to be 32 bytes. Studies have found that a majority of memory copy calls are relatively small (e.g., about 90% of memory copy requests are less than 32 bytes), and as a consequence, in many instances the reduction in overhead associated with the use of the jump table 106 translates into a perceptible improvement to the user's experience with the computing device 100. Referring briefly to FIG. 7, shown is a table with exemplary load and store instructions 108, but it should be recognized that these instructions are only examples and that additional, or fewer, load and store instructions may be utilized than those depicted in FIG. 7.

Beneficially the use of the jump table 106 to copy a fixed number of bytes is algorithmically very simple and reduces register usage. In connection with ARM architectures for example, it enables only five ARM general purpose registers ("GPRs") to be used for any fixed number of bytes copied, which means that only five values are in-use at any one time—inclusive of the original and current destination pointer, current source pointer and current size parameters that are passed into the memory copy component 104.

Another benefit of copying a fixed number of bytes is that the destination pointer is prevented from being modified, which allows for low latency/overhead—particularly in the jump table code. It should be noted that five GPRs is the number of registers left unreserved by the ARM Procedure Call Standard during a call to the memory copy component 104, but for other architectures, the number of free GPRs may be different. Regardless of the type of processor architecture that is implemented in the computing device 100, GPRs are a very limited resource, and reducing their usage is beneficial.

In many embodiments the memory copy component 104 also utilizes additional techniques to further improve the efficiency of copies regardless of whether the copy size is above or below the 32-byte threshold. For example, single-lane Neon operations may be used for memory copy loads and stores, and in addition, a compile-time option may be implemented to use either ARM or Neon loads and stores (or a mix of ARM loads and stores and Neon loads and stores). As one example, in connection with the Qualcomm Scorpion/Krait CPU hardware, an improved mix of instructions may include using ARM instructions for copies up to 4 bytes (using one GPR), while Neon instructions are used for copy size up to 16 or 32 bytes (using one or two SIMD registers), but this mix of instructions is certainly not required.

Another technique that may be utilized to further improve efficiency is for small copies to be inlined (such that only loads and stores remain) when the copy size at the caller is known at compile-time. This additional improvement is certainly not required and may be implemented as a header file change as opposed to an additional enhancement to the memory copy component 104.

The memory copy component 104 may also optionally use software preloads (also referred to as "PLDs" or "prefetches") to load data in advance once that data is known to be needed and without using additional cpu register resources. Optimal (or minimal) preload "distances" (the offset from current source addresses) may be chosen based on hardware characteristics including a combination of CPU clock rate, DRAM latencies, bus and DDR clock rates and other parameters. U.S. patent application Ser. No. 13/369,548, filed Feb. 9, 2012, entitled DETERMINING OPTIMAL PRELOAD DISTANCE AT RUNTIME," which is incorporated herein by reference in its entirety, discloses exemplary methodologies for selecting preload distance, but selection of preload distance may also be based upon empirical data obtained by testing on standard benchmarks. In connection with the use of preloads, start address alignment may be taken into account (not just size) to better optimize the number of PLDs needed and reduce wasted PLDs.

The methodologies disclosed herein using the jump table 106 may also be utilized in connection with methodologies for improving the performance of larger data sizes (e.g., a few kbytes in size). For example, techniques for copying larger sizes of data (also referred to herein as "big blocks") may be utilized when data sizes exceed a larger threshold (e.g., a few kbytes), and then the methodologies using the jump table 106 may be used to copy the final smaller block of bytes (e.g., 0 to 32 bytes) after all big blocks are copied.

As discussed in more detail further herein, yet another optional implementation to improve memory copy performance is the use of very aggressive initial "pump priming" preloads for X bytes near the beginning of a copy, while being careful not to exceed the capacity of the intended CPU's outstanding requests queue.

Figure 2:
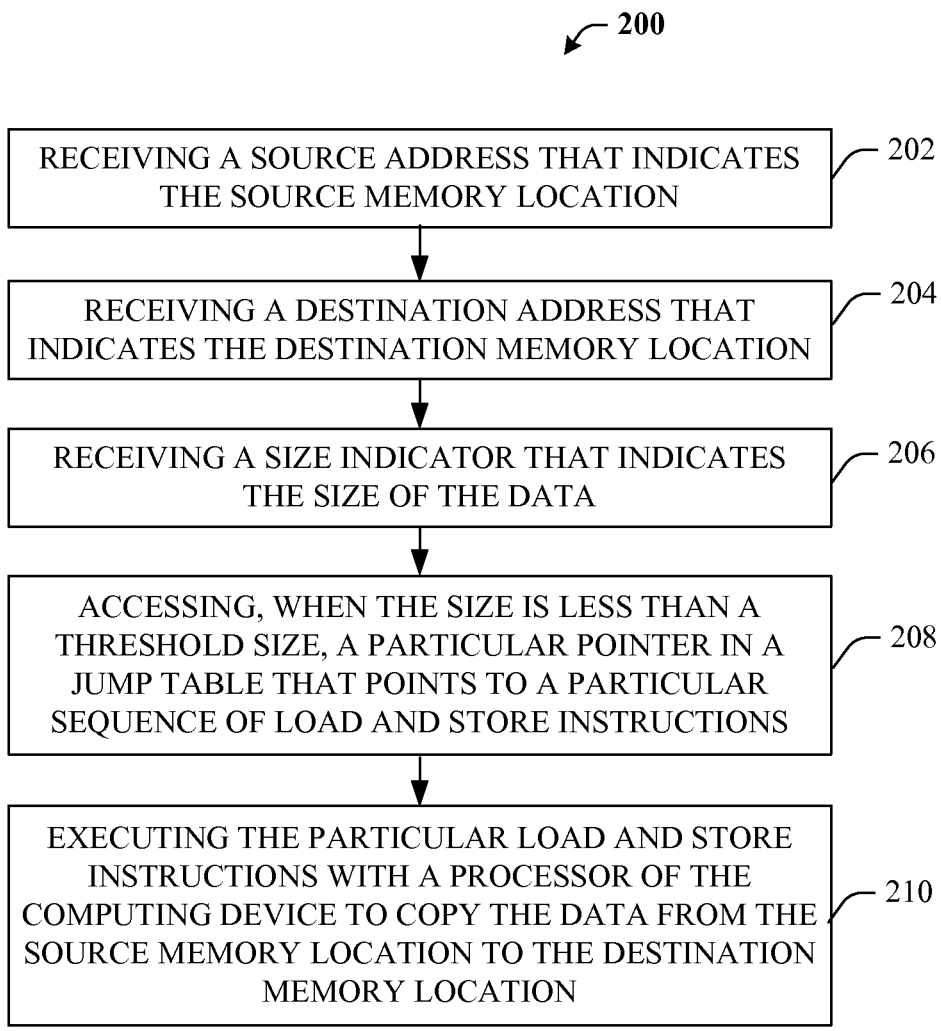
FIG. 2 is a flowchart depicting a method that may be traversed in connection with embodiments described herein.

Referring next to FIG. 2, it is a flowchart depicting an exemplary method that may be traversed in connection with embodiments described herein. As discussed above, the memory copy component 104 may utilize the same POSIX standard function prototype as the memcpy C language function; thus the memory copy component 104 may receive the following three values: a source address that indicates the source memory location (Block 202); a destination address that indicates the destination memory location (Block 204); and a size indicator that indicates the size of the data (Block 206).

As shown, when the size of the data to be copied is less than a threshold size, a particular pointer in a jump table (e.g., the jump table 106) that points to a particular sequence of load and store instructions (e.g., within the load and store instructions 108) is accessed (Block 208). As discussed above, depending upon the implementation, the threshold may vary in size, but it has been found that the most viable threshold is a relatively small size that is an integral power of two such as 8, 16, 32, 64, 128, or 256 bytes in size. As shown, the particular load and store instructions are executed with a processor of the computing device 100 to copy the data from the source memory (e.g., memory location 112) location to the destination memory location (e.g., memory location 114)(Block 210).

Beneficially, implementation of the jump table 106 enables the memory copy component 104 to utilize code (load and store instructions) that almost purely loads and stores data (as opposed to the prior, processor-intensive looping techniques). Moreover, many implementations enable memory copies to be effectuated with a reduced number of registers. More specifically, using the jump table 106 as compared to using multiple loops reduces register usage because when it is known, at compile time, how big the copy is going to be, the number of registers that is required is reduced. For example, if 32 bytes are copied, the first 16 bytes can be loaded into one register and the second 16 bytes into another register and then both of those registers may be stored back into memory. So it is possible using the jump table 106 to make a memory copy while only using two registers, which is fewer registers than prior approaches utilized, and the reduced register usage may eliminate the need to use the stack in connection with a memory copy. In addition, because the size in known in advance, no looping or size comparison instructions are needed, thereby utilizing the absolute minimum number of instructions and registers that are needed for each size.

In the context of ARM architectures for example, the memory copy component 104 is called with destination pointer, source pointer and copy size that utilizes three GPR registers, and the two additional unreserved registers (e.g., GPR-U1 and GPR-U2) are free for use in connection with loading and storing the data. As a consequence, registers need not be moved to the stack to enable the memory copy to take place; thus reducing or eliminating "expensive" overhead that would occur in the form of movement of data to and from the stack.

It is contemplated that various approaches may be implemented to realize the jump table 106 that is depicted in FIG. 1, but two exemplary approaches are detailed herein. The first approach is anticipated to require about half of the code that is needed to implement the second approach, but the first approach is anticipated to be nearly as fast as the second approach. And on some systems (e.g., some combinations of CPU, cache, and RAM) the first approach will be a better approach, but in other systems the second approach will be a better approach.

Jump Table Implementation Type-1

In connection with the first approach to implementing the jump table 106, a copy size is initially compared to the length of the jump table (typically copy sizes up to 32 bytes are handled). Then the address of the beginning of the jump table code is added to the size*(instruction word size), and execution is branched to that address. In connection with ARM architectures for example, non-thumb ARM instructions are 4 bytes in size so the copy size is multiplied by four and added to the address of the beginning of the jump table.

The jump table is then implemented as a collection of branch (or goto) instructions (e.g., 33 branch instructions) as follows:
  a. Branch to handler for 0 bytes or More than 32 byte copy
  b. Branch to handler for 1 byte copy
  c. Branch to handler for 2 byte copy
  d. . . .
  e. Branch to handler for 31 byte copy
  f. Branch to handler for 32 byte copy The handler branches in the jump table here may alternately be implemented using PC-relative offsets rather than branch instructions. Typically these offsets are 8-bits or 16-bits in size using branch table instructions. On ARM v7 CPUs, for example, tbh and tbb instructions may be used. Using PC-relative offsets typically reduces the size of the jump table but does not typically improve performance.

The construction of the handler code may vary because multiple ways of copying each size are possible using different combinations of load/store instructions, but an exemplary approach to construct handler code is as follows:
  a. Handler for 0 bytes or more than 32 bytes: return from function if zero bytes or continue after jump table otherwise. (Zero should be a rare case, so this should be uncommon)
  b. Handler for 1 byte copies: load one byte from source pointer into GPR, store one byte to destination pointer (without incrementing destination). Return from function.
  c. Handler for 2 Byte Copies: load two bytes from source pointer into GPR, store two bytes to destination pointer (without incrementing destination). Return from function.
  d. . . .
  e. Handler for 9 byte copies: load eight bytes from source pointer into SIMD register, load one byte from source pointer into GPR register, store eight bytes to destination pointer (incrementing destination) and store one byte to destination pointer (incrementing destination), and subtract 9 from destination pointer. Return from function.
  f. . . .
  g. Handler for 12 byte copies: load eight bytes from source pointer into SIMD register, load four bytes from source pointer into GPR register, store eight bytes to destination pointer (incrementing destination) and store four bytes to destination pointer (incrementing destination), and finally subtract 9 from destination pointer. Return from function.
  h. . . .
  i. Handler for 16 Byte Copies: load sixteen bytes from source pointer into SIMD register, store eight bytes to destination pointer (without incrementing destination). Return from function.
  j. . . .
  k. Handler for 31 Byte Copies: load 16 bytes from source pointer into one SIMD register and 8 bytes into another SIMD register, then load 4, 2, and 1 bytes into three different registers, then Store 16 Bytes and 8 bytes from two SIMD registers to destination pointer (incrementing destination), and then store 4, 2, and 1 bytes from three different GPR registers to destination pointer (incrementing destination each time). Return from function.

In the above handler code, the loads may be combined for the most efficient power-of-two sizes with stores for the most efficient power-of-two sizes. The most efficient load/store is the combination that handles the most data with the fewest instructions. The algorithm for generating the most efficient code is to create a sum of sizes that add up to the copy size using the fewest numbers, which may be implemented as follows:
  i. (See FIG. 7 for supporting instruction information)
  ii. All loads should precede stores if possible, but loads and stores may alternate if too few registers are available to hold loaded data until the first store needs to be done. Since only three GPRs are free (on ARM), only up to 3 ARM loads can precede corresponding ARM stores before registers must be reused.
  iii. Take the largest power of 2 less than copy size (up to 32 bytes—the largest load/store in one instruction from the table in the FIG. 7).
  iv. Do a load or store for this power of 2, subtract the power of 2 from copy size and go back to step ii, if remaining copy size >0.
  v. Finally, if destination pointers needed to be incremented in the above code, then subtract the original copy size from the destination pointer before returning from the function in the jump table.

In the above algorithm, choose to use ARM or Neon instructions according to these considerations.
  i. In the above handler, loads via source pointers should always auto-increment the source pointers. The destination pointer may (or may not) be auto-incremented when using load instructions, depending on the number of Neon stores used (see below).
  ii. 1, 2 or 4 byte load/stores are most efficient on some architectures (e.g., Scorpion and Krait CPUs), but this may not be the case on other CPUs. ARM loads/stores also support base address constant offsets, so multiple stores can be done without modifying the destination pointer. In many implementations, when only ARM stores are used, only base address offsets are used (and not auto-incrementing of the destination pointer). Since ARM instructions allow for non-incrementing destination pointers, they may be preferred.
  iii. But ldrd/strd and ldrm/strm are difficult to use efficiently for larger loads and stores, and as a consequence, Neon instructions may be used instead.
  iv. 8, 16 and 32 byte copies are typically most efficient using Neon loads and stores on all CPUs with Neon units.
  v. But Neon load/store instructions do not support constant address offsets from a base address (as ARM loads/stores do). This means that Neon loads/stores must either use a fixed (non-incrementing base address) or auto-incrementing pointer addresses (which increase the base address). This means that if more than one Neon load/store is used per handler, then auto-incrementing must be used and an instruction to decrement the destination pointer by the original copy size must be added to the end of the handler.
  vi. Neon often cannot be used in the operating system's kernel, so ARM instructions only must be used in the kernel (this is true within Linux and Android kernels and on many other operating systems).

Jump Table Implementation Type-2:

The second jump table implementation described herein is similar to the first type-1 implementation described above except there are no branches to jump from jump table to handlers. Instead, handlers are embedded directly in the jump table (if they fit). If the handlers do not fit in the jump table, there is a jump to a different handler address. For smaller copy sizes (e.g., copy size less than or equal to 32 bytes), all copy size handlers except those for 27, 28, 29, 30, and 31 bytes fit within 8 instruction slots (32 bytes) for code generated as described above in the Type-1 Jump table. The exception sizes are very unlikely sizes for typical memory copy calls, therefore the additional instructions needed are rarely used.

In connection with the second approach to implementing a jump table (e.g., jump table 106), a copy size is initially compared to the length of the jump table (typically copy sizes up to 32 bytes are handled). Then the address of the beginning of the handler code is added to the instruction size*(instruction word size)*8, and execution is branched to that address (6 of 33 handlers take less than or equal to 8 instructions). In connection with ARM architectures for example, non-thumb ARM instructions are 4 bytes in size so the size is multiplied by four and eight and added the address of the beginning of the handler code.

The construction of the handler code may vary because multiple ways of copying each size are possible, but an exemplary approach to construct handler code is as follows:

a. Handler for 0 bytes or more than 32 bytes: Return from Function if Zero Bytes or Continue after Jump Table Otherwise. (Zero should be a rare case, so this should be uncommon.)
b. Handler for 1 Byte Copies: Load one byte from Source Pointer into GPR, Store One Byte to Destination Pointer (without incrementing destination). Return from Function.
c. Handler for 2 Byte Copies: Load two bytes from Source Pointer into GPR, Store Two Bytes to Destination Pointer (without incrementing destination). Return from Function.
d. . . .
e. Handler for 9 Byte Copies: Load eight bytes from Source Pointer into SIMD Register, Load one byte from Source Pointer into GPR Register, Store Eight Bytes to Destination Pointer (incrementing destination) and Store One Byte to Destination Pointer (incrementing destination), and subtract 9 from destination pointer. Return from Function.
f. . . .
g. Handler for 15 Byte Copies: Handler code is more than 8 instructions, so assemble a branch to final handler, which loads 8, 4, 2, and 1 bytes and then stores 8, 4, 2, and 1 bytes.
h. Handlers for 27, 28, 29, 30, and 31 bytes: Branch to different addresses and implement the handlers according to Type 1.
i. . . .

The creation of handler code described above in connection with the type-1 jump table code may be utilized to create the handler code of the type-2 implementation.

Although the methodology for relatively small copies, discussed above with reference to FIG. 2, produces substantial improvements by reducing processing overhead associated with relatively small memory copies, as discussed above, additional techniques may be employed in connection with the methodology described with reference to FIG. 2 to more generally improve memory copy processes.

Figure 3:
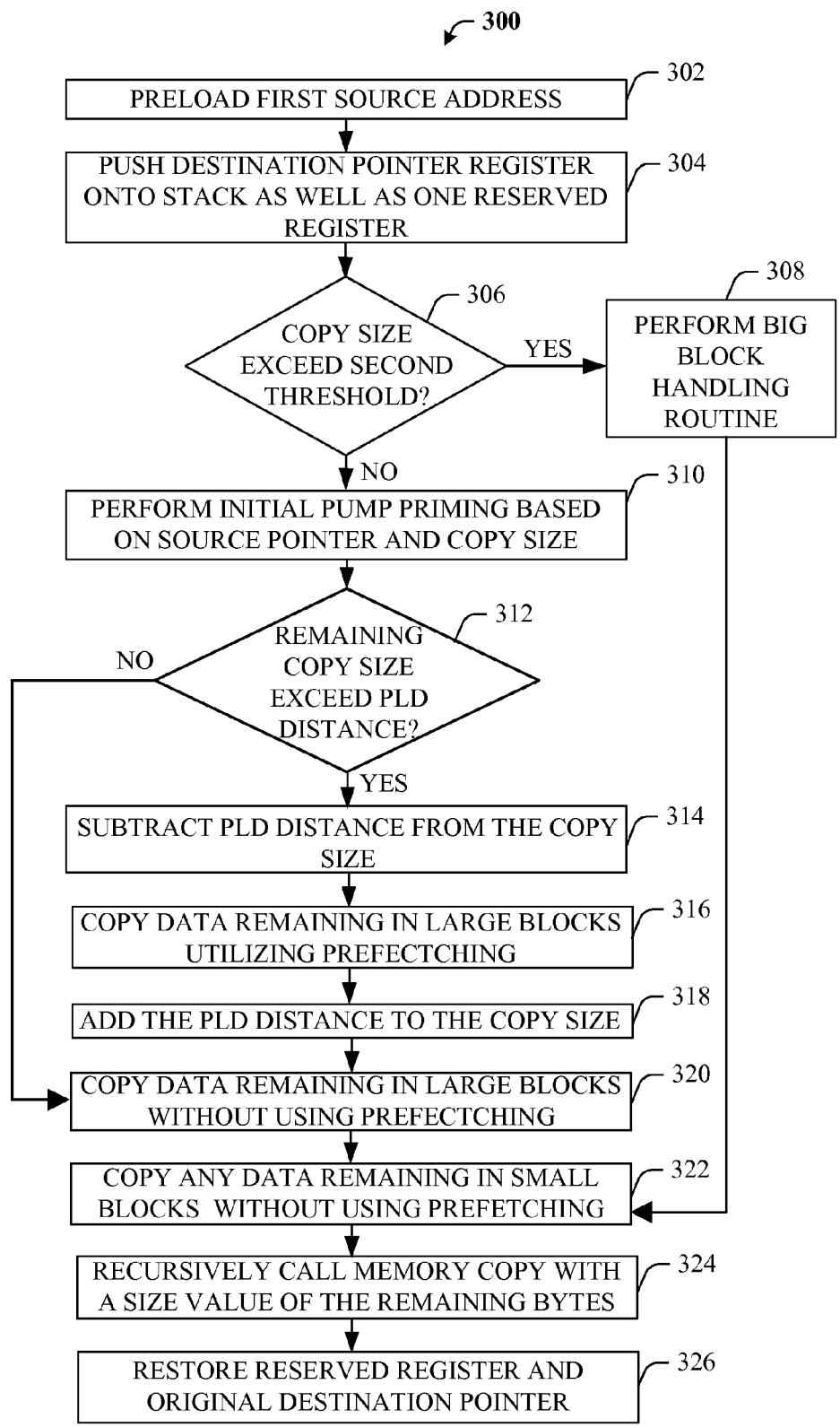
FIG. 3 is a flowchart depicting additional methodologies that may be carried out in connection with embodiments described herein.

Referring next to FIG. 3 for example, it is a flowchart depicting exemplary steps and methodologies that may be utilized in connection with the methodology described with reference to FIG. 2. It should be recognized however that the steps and methodologies described with reference to FIG. 3 need not be implemented to obtain performance improvements. In other words, viable embodiments may be implemented using a subset, one, or none of the steps and methodologies described with reference to FIG. 3.

As shown in FIG. 3, when copy sizes exceed the threshold (e.g., 32 bytes or other relatively small copy size) discussed with reference to Block 208 and FIG. 2, additional methodologies may be employed to improve performance of memory copy operations. More specifically, when the copy size exceeds the threshold discussed with reference to Block 208, the first source address may be unconditionally preloaded (Block 302), which signals to the cache/memory system that this data will need to be read soon.

In addition, the destination pointer register may be pushed on to the stack to save the original value, as well as one reserved register (Block 304). In connection with an ARM architecture, at this point three registers are "free:" GPR-C, GPR-U1, and GPR-U2. These are the minimum found to be required in practice to implement the following steps using mixed ARM and Neon code. In one exemplary implementation, GPR-C is T4, GPR-U1 is r3 and GPR-U2 is r12, but this is certainly not necessary. As shown in FIG. 3, if the copy size exceeds a third threshold (e.g., several kbytes)(Block 306), then a "big block" handling routine may optionally be performed (Block 308). Additional details of an exemplary big block copy routine are provided in U.S. Patent Application No. 61/606,757, filed Mar. 5, 2012, entitled ACCELERATED INTERLEAVED MEMORY DATA TRANSFERS IN MICROPROCESSOR-BASED SYSTEMS, AND RELATED DEVICES, METHODS, AND COMPUTER READABLE MEDIA, which is incorporated herein by reference in its entirety.

In addition, initial pump priming may be optionally performed based upon the source pointer and the copy size (Block 310). Although not required, the initial pump priming may be carried out as follows:

1. Effective line size (typically L2 line size) is 128 bytes on Scorpion; 64 or 128 bytes on Krait; and 32 bytes on other architectures.
2. First PLD is performed at the source address. Even though an initial PLD is not strictly necessary for very short copies, it is not known how many PLDs are needed until at least step 6 below, so in many implementations one initial PLD is done unconditionally here.
3. The last PLD address is the starting source address+copy size bitwise-anded with bitwise inversion of (EffLineSize−1).
   a. The "C" code equivalent is: lastPLDLineAddress= (sourceAddress+Size) & ~(EffLineSize−1)
4. The first PLD line is the source address bitwise-anded with bitwise inversion of (EffLineSize−1).
   a. The "C" Code Equivalent is: FirstPLDLineAddress= (sourceAddress) & ~(EffLineSize−1)
5. The total number of PLDs is: (lastPLDLineAddress− firstPLDLIneAddress)/EffLineSize.
   a. The "C" code equivalent is: TotalNumberOfPLDs= (lastPLDLineAddress−firstPLDLIneAddress)/EffLineSize
6. Because the first PLD is already done, do TotalNumberOfPLDs PLDs.
7. As discussed above, a more optimal PLD distance can be computed (as disclosed in the above-identified patent application Ser. No. 13/369,548) or determined experimentally that is system-specific.
8. If the total Number of PLDs is less than this more optimal distance, then only initial PLDs are needed.
9. Otherwise, the remainder of PLDs are spread across an initial block copy, using the effective line size as the number of bytes for copy iteration loop (e.g., using a "copy block" method discussed below).

Figure 4:
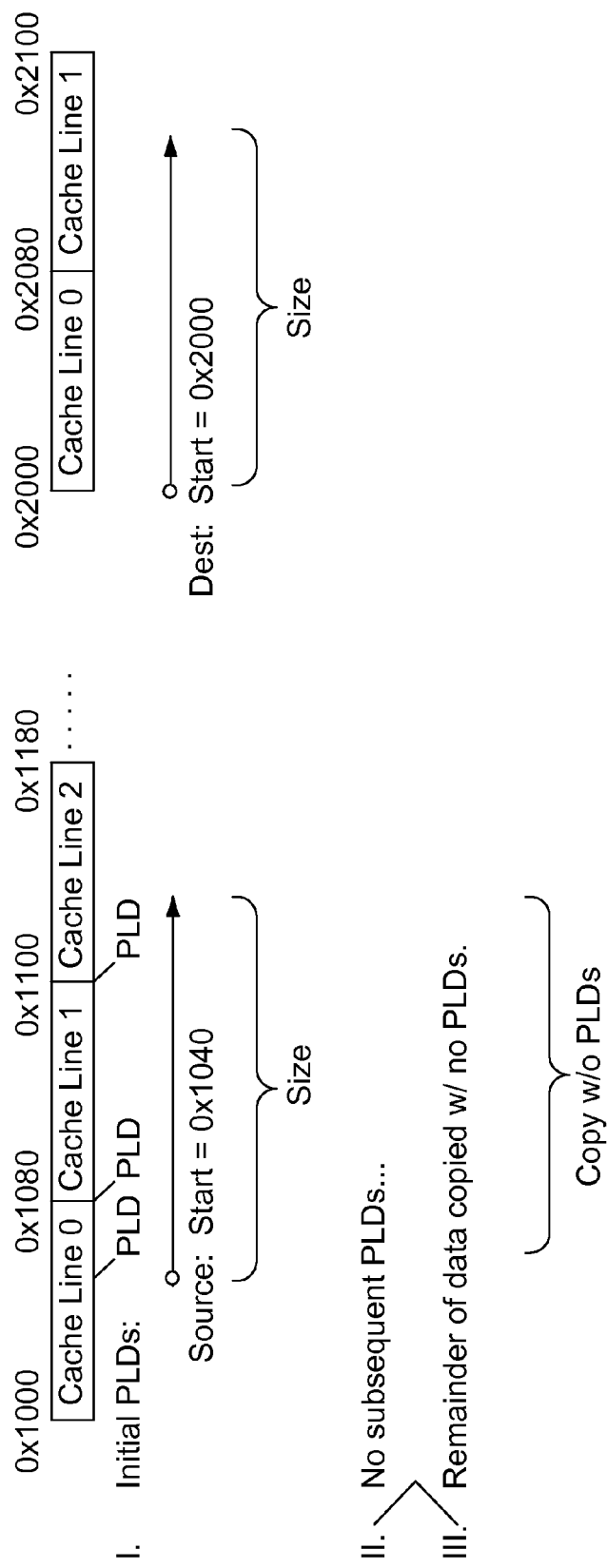
FIG. 4 is a is a graphical representation of an exemplary memory copy process.

Referring briefly to FIGS. 4 and 5, shown are graphical representations of memory copy operations for copy sizes of 220 bytes and 1200 bytes, respectively. More specifically, shown are the preloading of the first source address (Block 302) and the initial pump priming based upon the source pointer and copy size (Block 310). In general, preloading is utilized so that when the CPU begins to execute the copy code, data is already in the cache, and load and store instructions may be performed in parallel; thus improving performance.

As shown in FIG. 3, if the remaining copy size is larger than the PLD distance (Block 312), then the PLD distance is subtracted from the copy size in order to prevent the PLDs from prefetching data from beyond the copy size range (Block 314). The data remaining is then copied in large blocks utilizing prefetching (Block 316), and the PLD distance is added to the copy size (Block 318). Typically each loop iteration copies a number of bytes equal to an effective line size (e.g., 64 or 128 bytes on Krait/Scorpion architectures, and 32 bytes on most other ARM chips). FIG. 5 depicts an example in which the remaining copy size is larger than the PLD distance (Block 312), and as a consequence, the remaining data is copied in large blocks utilizing prefetching (Block 316) as shown in connection with step II in FIG. 5.

If the remaining copy size is not larger than the PLD distance (Block 312) then the data remaining in large blocks is copied without using prefetching (Block 320). FIG. 4 depicts an example of a memory copy in which the copy size is not greater than the PLD distance (Block 312), and as a consequence, the remaining data is copied in large blocks without prefetching (Block 320) as depicted in steps II and III in FIG. 4. Typically each loop iteration copies a number of bytes equal to an effective line size (e.g., 64 or 128 bytes on Krait/Scorpion architectures and 32 bytes on most other ARM chips). Then any data remaining is copied using small blocks (Block 322). Although not required, each loop iteration may copy blocks of a size of the first threshold (e.g., 32 bytes each).

The following is an exemplary "copy block" methodology that may be traversed in connection with Blocks 316, 320, and 322:

1. For each copy block, there are the following parameters in registers:
   a. Copy Size (in bytes)
   b. Destination pointer address
   c. Source pointer address
   a. If PLDs are needed, the PLD address is passed in (e.g., using the next PLD line address) and handled as discussed below.
2. In addition, there are the following constant (or fixed) values for each particular usage of the algorithm (e.g., they are compile-time parameters and not passed in as registers):
   a. copy block size (in bytes, typically 32 or 128)—this is also referred to herein as the effective line size
   b. Boolean that is true if PLDs are needed.
   c. PLD distance offset (if PLDs are used)
3. If PLDs are needed, the first instruction may be a PLD.
   a. The PLD instruction parameter may use the current PLD line address.
   b. Additional PLD hints may also be specified. For example, one hint is whether data is to be streamed or not. Streaming data is transient and temporal and may not be expected to be needed again. Thus, streamed data may be removed from cache memory shortly after it is loaded. This may make some data streaming operations more efficient because of less cache use.
   Another hint is whether data is expected to be read and/or written in the future. These hints can be combined. Also, some or all of these hints may or may not be available depending on the type of CPU chip employed.
   c. If PLDs are not needed, do nothing for this step.
4. Then the copy block size may be compared to copy size and the rest of the copy process may be skipped if the copy size remaining is less than the size of the block.
5. The copy size is then decremented by the copy block size and the PLD address is incremented by the effective line size.
6. Loads and stores are then executed for a copy block size. For a particular fixed copy block size, there will be a sequence of loads and stores, as follows.
   a. Use the algorithm for generating a sequence of loads and stores according the jump table type-1 algorithm for a particular copy size, with one exception: instruction variants that store data will always use incrementing source and destination pointers here (this insures that source and destination pointers will step through the data consistently).
   b. Because destination pointer is auto-incremented and original destination pointer does not need to be restored, no decrementing of destination pointer here is needed.
7. Jump back to step 4. It should be noted that the ordering of steps can be different. For example, steps 4 and 5 could be modified and moved to just before step 7.
8. It should also be noted that the destination and source pointer and copy size will be modified to reflect any remaining copies that need to be done after previous step is complete.

The memory copy function may then be recursively called with a size value of the remaining bytes (Block 324). At this point in time, a relatively small size (e.g., less than 32 bytes) of data remains to be copied, so the methodology that uses the jump table described with reference to FIG. 2 may be utilized to effectuate a very efficient copy execution. It has been found that the destination pointer may be overwritten during this process, and as a consequence, the original destination pointer is restored, along with the reserved register value, by popping these two values from the stack (Block 326).

Referring next to FIG. 6, shown is an example of a processor-based system 70 that can employ accelerated interleaved memory data transfers according to the embodiments disclosed herein. In this example, the processor-based system 70 includes one or more central processing units (CPUs) 72, each including one or more processors 74. The CPU(s) 72 may have cache memory 76 coupled to the processor(s) 74 for rapid access to temporarily stored data, and which may include interleaved memory and be used for data transfers as discussed above. The CPU(s) 72 is coupled to a system bus 78 and can intercouple master devices and slave devices included in the processor-based system 70. As is well known, the CPU(s) 72 communicates with these other devices by exchanging address, control, and data information over the system bus 78. For example, the CPU(s) 72 can communicate bus transaction requests to the memory controller 80 as an example of a slave device. Although not illustrated in FIG. 6, multiple system buses 78 could be provided, wherein each system bus 78 constitutes a different fabric.

Other devices can be connected to the system bus 78. As illustrated in FIG. 6, these devices can include a system memory 82 (which can include program store 83 and/or data store 85), one or more input devices 84, one or more output devices 86, one or more network interface devices 88, and one or more display controllers 90, as examples. The input device(s) 84 can include any type of input device, including but not limited to input keys, switches, voice processors, etc. The output device(s) 86 can include any type of output device, including but not limited to audio, video, other visual indicators, etc. The network interface device(s) 88 can be any devices configured to allow exchange of data to and from a network 92. The network 92 can be any type of network, including but not limited to a wired or wireless network, private or public network, a local area network (LAN), a wide local area network (WLAN), and the Internet. The network interface device(s) 88 can be configured to support any type of communication protocol desired.

The CPU 72 may also be configured to access the display controller(s) 90 over the system bus 78 to control information sent to one or more displays 94. The display controller(s) 90 sends information to the display(s) 94 to be displayed via one or more video processors 96, which process the information to be displayed into a format suitable for the display(s) 94. The display(s) 94 can include any type of display, including but not limited to a cathode ray tube (CRT), a liquid crystal display (LCD), a plasma display, etc.

Referring again to FIG. 7, some additional notes are provided below that those of ordinary skill in the art will appreciate may be useful in connection with the various embodiments disclosed herein.

With respect to GPR register assignments in ARM units, reserved registers (inferred from the ARM procedure call standard) are as follows: r4-r11, r13-r15. Unreserved registers (that can be used for any purpose within a function call) are r0-r3, and r12. Parameters with memcpy arguments:

r0—dst (destination pointer)
  r1—src (source pointer)
  r2—size (size of copy in bytes)

In connection with Neon register assignments on a Neon unit, reserved registers (inferred from the ARM procedure call standard) are as follows: q4-q7 (which is equivalent to d8-d15). Unreserved registers (that can be used for any purpose within a function call) are q0-q3, and q8-q15.

In many embodiments alignment checking is disabled, and as a consequence, ldrb/strb, ldrh/strh, and ldr/str have no GPR restrictions and no alignment restrictions. Furthermore, ldrb/strb, ldrh/strh, and ldr/str instructions (unlike Neon load/store instructions) support address offsets to a base address, which makes it both easy and efficient to load and store a number of bytes without modifying the base address (this makes it desirable to use for dst pointer stores in jump tables—where dst needs to be returned unchanged).

Use of ldrd/strd requires the use of even-numbered GPRs and requires 8-byte data address alignment (even with alignment checking disabled), which makes them difficult to use to for general memory copy use. As a consequence, several embodiments do not utilize these load/store instructions.

Use of ldrm/strm requires 8-byte data address alignment (even with alignment checking disabled), which makes them difficult to use to for general memory copy use, and as a consequence, several embodiments do not use these load/store instructions. Furthermore, since ldrd/strd and ldrm/strm each require large numbers of very scarce GPR registers, usage of these instructions usually requires more expensive push and pop operations.

As used herein, "address alignment" is a requirement that a pointer address be a multiple of some integer—typically 2, 4, 8, 16, (or some other power of 2). For example, 8-byte-aligned data refers to pointers that must contain addresses that are multiples of 8:

2-byte alignment is often called halfword-alignment.
  4-byte alignment is often called word-alignment.
  8-byte alignment is often called double word-alignment (DW alignment in table above).
  16-byte alignment is often called quadword-alignment (QW alignment).

With alignment checking disabled (which is assumed in several embodiments), all single-lane and all-lane Neon operations do not require any alignment.

The Neon (SIMD) unit is standard on all Qualcomm Scorpion and Krait CPUs—Qualcomm's optimized Neon implementation is known as VeNum. Neon is optional on other ARM CPUs such as Cortex A8 and A9, and performance is only half as fast in general, so Neon usage may not be as advantageous relative to use of ARM instructions.

Neon has three different SIMD register sizes (NOTE: S, D and Q registers overlap):

32×32-bit Single ("S") registers
  32×64-bit Double ("D") registers
  16×128-bit Quad ("Q") registers Many non-ARM architectures have SIMD units similar to Neon. For example:

PowerPC has Altivec (SIMD with 32×128-bit registers)
  Intel has SSE units for most x86 CPUs (SIMD with 16×128-bit registers)
  Intel has also released a SIMD unit for x86 called AVX (SIMD with 32×128 or 32×256-bit registers).

On many non-ARM architectures, single-lane operations may not be supported for loads and stores, or there may be ranged operations. In general, SIMD registers have one or more "lanes" per register. Since SIMD data has multiple elements per register, each lane contains one element of data. For example, 128-bit SIMD registers may have four 32-bit integers (four elements or lanes), or eight 16-bit integers (eight lanes), or sixteen 8-bit characters (16 lanes). So, a single-lane, eight-bit load only loads 8-bits. A "ranged" SIMD instruction may operate on more than one lane but fewer than all lanes.

Mixing use of GPR load/stores and Neon load/stores in close proximity for memory copy operations can result in pipeline collisions on some non-Scorpion/non-Krait CPUs (which will reduce performance), but this problem generally does not occur on Qualcomm CPUs when loads and stores don't overlap.

Therefore, as the table in FIG. 7 makes clear, on Qualcomm CPUs, use of single-GPR ARM instructions for 1, 2 or 4 bytes and Neon "all lane" instructions for 8, 16 and 32 byte load stores is typically an optimal mix of instructions on Scorpion and Krait CPUs.
  On other architectures, "single-lane" Neon and "all-lane" Neon for all loads and stores may result in better performance for all ARM CPUs with Neon.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for copying data from a source memory location to a destination memory location on a computing device, the method comprising:
    receiving a source address indicating the source memory location;
    receiving a destination address indicating the destination memory location;
    receiving a size indicator indicating a copy size of the data;
    accessing, when the copy size is less than a threshold size, a particular pointer in a jump table that points to particular load and store instructions based upon the copy size of the data, the jump table including a plurality of pointers, each of the plurality of pointers pointing to a corresponding one of a plurality of load and store instructions; and
    executing the particular load-store instructions on the computing device to copy the data from the source memory location to the destination memory location.

2. The method of claim 1, including:
    utilizing single-lane Neon instructions for copy sizes less than a second threshold.

3. The method of claim 1 including utilizing a mix of ARM and Neon instructions.

4. The method of claim 1 including, when the copy size is greater than a threshold size:
    preloading the source address; and
    pushing a destination pointer register and a reserved register onto a stack memory.

5. The method of claim 4 including performing initial pump priming based upon the source pointer if the copy size of the data does not exceed a second threshold.

6. The method of claim 5, including selecting a preload distance based upon at least one of hardware characteristics of the computing device and experimental results.

7. The method of claim 4, including performing a big block handling routine if the copy size of the data exceeds a second threshold.

8. The method of claim 1, wherein each of the plurality of the load and store instructions corresponding to a data copy size consume a variable number of bytes and each of the plurality of pointers to the load and store instructions consume a fixed number of bytes such that the particular pointer for the copy size of the data can be accessed by adding a current program counter with a product of the copy size of the data times a number of bytes consumed by the particular pointer.

9. A method for copying data from a source memory location to a destination memory location on a computing device, the method comprising:
    receiving a source address indicating the source memory location;
    receiving a destination address indicating the destination memory location;
    receiving a size indicator indicating a copy size of the data;
    calculating, when the copy size is less than a threshold size, a pointer to a particular set of load and store instructions in one particular entry of a plurality of function table entries, each of the function table entries is a same fixed size, and the calculating of the pointer is based upon the copy size of the data and the fixed size of the function table entries;
    executing the particular set of load-store instructions on the computing device to copy the data from the source memory location to the destination memory location; and
    jumping, if the particular set of load and store instructions does not fit within the fixed size of the particular entry, to a remainder of the load and store instructions to complete the copy of the data from the source memory location to the destination memory location.

10. A computing apparatus comprising:
    at least one processor;
    memory to store data that is processed by the processor;
    a plurality of load/store instruction sets, each of the plurality of load/store instruction sets, when executed, transfer a particular number of bytes;
    a jump table including pointers to each of the plurality of load/store instruction sets; and
    a memory copy component that receives a source address, a destination address, and an indicator of a copy size of data to be copied and utilizes the jump table to initiate execution of a particular load/store instruction set based upon the copy size of the data to be copied to copy the data from the source address in the memory to the destination address in the memory.

11. The computing apparatus of claim 10, wherein the memory copy component utilizes single-lane Neon instructions for copy sizes less than a second threshold.

12. The computing apparatus of claim 10, wherein the memory copy component utilizes a mix of ARM and Neon instructions.

13. The computing apparatus of claim 10, wherein the memory copy component preloads, when the copy size is greater than a threshold size, the source address, and pushes a destination pointer register and a reserved register onto a stack memory.

14. The computing device of claim 13, wherein the memory copy component performs initial pump priming based upon the source pointer if the copy size of the data does not exceed a second threshold.

15. The computing device of claim 14, wherein the memory copy component selects a preload distance based upon at least one of hardware characteristics of the computing device and experimental results.

16. The computing device of claim 13, wherein the memory copy component performs a big block handling routine if the copy size of the data exceeds a second threshold.

17. The computing device of claim 10, wherein each of the plurality of the load/store instruction sets consume a variable number of bytes and each of the pointers consume a fixed number of bytes such that each of the pointers is accessed by adding a current program counter with a product of the copy size of the data times a number of bytes consumed by each corresponding pointer.

18. A computing apparatus comprising:
means for receiving a source address indicating the source memory location;
means for receiving a destination address indicating the destination memory location;
means for receiving a size indicator indicating a copy size of the data;
means for accessing, when the copy size is less than a threshold size, a particular pointer in a jump table that points to particular load and store instructions based upon the copy size of the data, the jump table including a plurality of pointers, each of the plurality of pointers pointing to a corresponding one of a plurality of load and store instructions; and
means for executing the particular load-store instructions on the computing device to copy the data from the source memory location to the destination memory location.

19. The computing apparatus of claim 18, including:
means for utilizing single-lane Neon instructions for copy sizes less than a second threshold.

20. The computing apparatus of claim 18 including means for utilizing a mix of ARM and Neon instructions.

21. The computing apparatus of claim 18 including, when the copy size is greater than a threshold size:
means for preloading the source address; and
means for pushing a destination pointer register and a reserved register onto a stack memory.

22. The computing apparatus of claim 21 including means for performing initial pump priming based upon the source pointer if the copy size of the data does not exceed a second threshold.

23. The computing apparatus of claim 22, including means for selecting a preload distance based upon at least one of hardware characteristics of the computing device and experimental results.

24. The computing apparatus of claim 21, including means for performing a big block handling routine if the copy size of the data exceeds a second threshold.

25. The computing apparatus of claim 18, wherein each of the plurality of the load and store instructions corresponding to a data copy size consume a variable number of bytes and each of the plurality of pointers to the load and store instructions consume a fixed number of bytes such that the particular pointer for the copy size of the data can be accessed by adding a current program counter with a product of the copy size of the data times a number of bytes consumed by the particular pointer.

26. A non-transitory, tangible computer readable storage medium, encoded with processor readable instructions to perform a method for copying data from a source memory location to a destination memory location on a computing device, the method comprising:
receiving a source address indicating the source memory location;
receiving a destination address indicating the destination memory location;
receiving a size indicator indicating a copy size of the data;
accessing, when the copy size is less than a threshold size, a particular pointer in a jump table that points to particular load and store instructions based upon the copy size of the data, the jump table including a plurality of pointers, each of the plurality of pointers pointing to a corresponding one of a plurality of load and store instructions; and
executing the particular load-store instructions on the computing device to copy the data from the source memory location to the destination memory location.

27. The non-transitory, tangible computer readable storage medium of claim 26, the method including:
utilizing single-lane Neon instructions for copy sizes less than a second threshold.

28. The non-transitory, tangible computer readable storage medium of claim 26, the method including utilizing a mix of ARM and Neon instructions.

29. The non-transitory, tangible computer readable storage medium of claim 26, the method including, when the copy size is greater than a threshold size:
preloading the source address; and
pushing a destination pointer register and a reserved register onto a stack memory.

30. The non-transitory, tangible computer readable storage medium of claim 29, the method including performing initial pump priming based upon the source pointer if the copy size of the data does not exceed a second threshold.

31. The non-transitory, tangible computer readable storage medium of claim 30, the method including selecting a preload distance based upon at least one of hardware characteristics of the computing device and experimental results.

32. The non-transitory, tangible computer readable storage medium of claim 29, the method including performing a big block handling routine if the copy size of the data exceeds a second threshold.

33. The non-transitory, tangible computer readable storage medium of claim 26, wherein each of the plurality of the load and store instructions corresponding to a data copy size consume a variable number of bytes and each of the plurality of pointers to the load and store instructions consume a fixed number of bytes such that the particular pointer for the copy size of the data can be accessed by adding a current program counter with a product of the copy size of the data times a number of bytes consumed by the particular pointer.

* * * * *